Oct. 27, 1970     D. POST     3,536,371
METHOD AND MEANS FOR PRODUCING AND UTILIZING ARRAYS OF
DIFFRACTION TYPE LENSES FOR MICROELECTRONICS
MASK MAKING

Filed July 20, 1967     4 Sheets-Sheet 1

INVENTOR
DANIEL POST
BY KARL W. FLOCKS
ATTORNEY

INVENTOR
DANIEL POST
BY KARL W. FLOCKS
ATTORNEY

Oct. 27, 1970  D. POST  3,536,371
METHOD AND MEANS FOR PRODUCING AND UTILIZING ARRAYS OF
DIFFRACTION TYPE LENSES FOR MICROELECTRONICS
MASK MAKING
Filed July 20, 1967  4 Sheets-Sheet 3
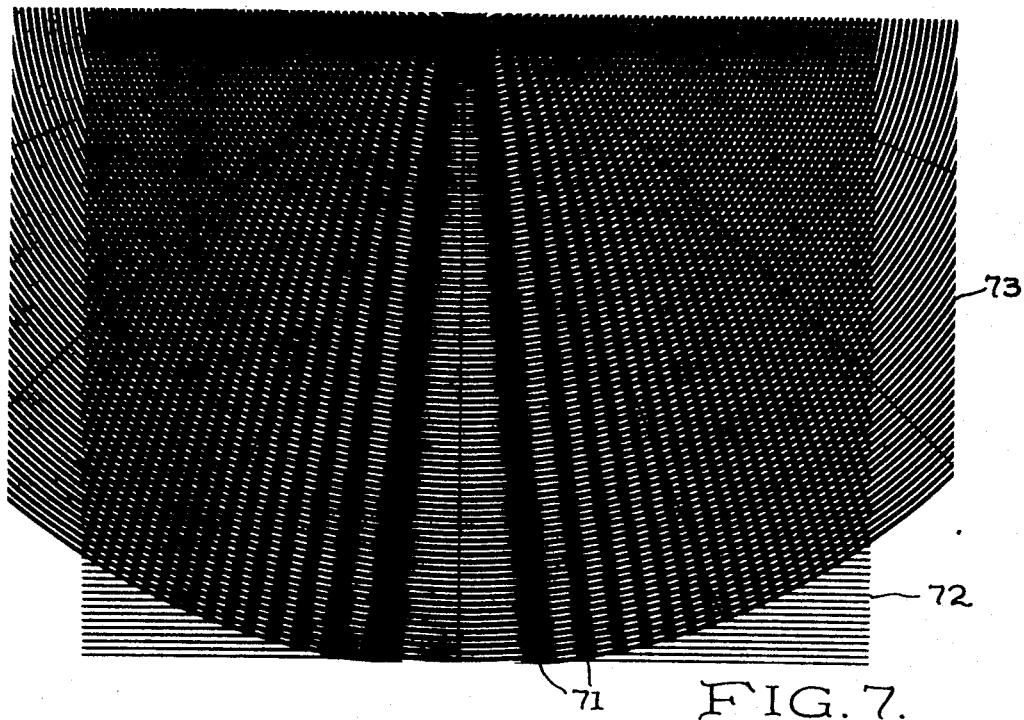
FIG. 7.
FIG. 8.
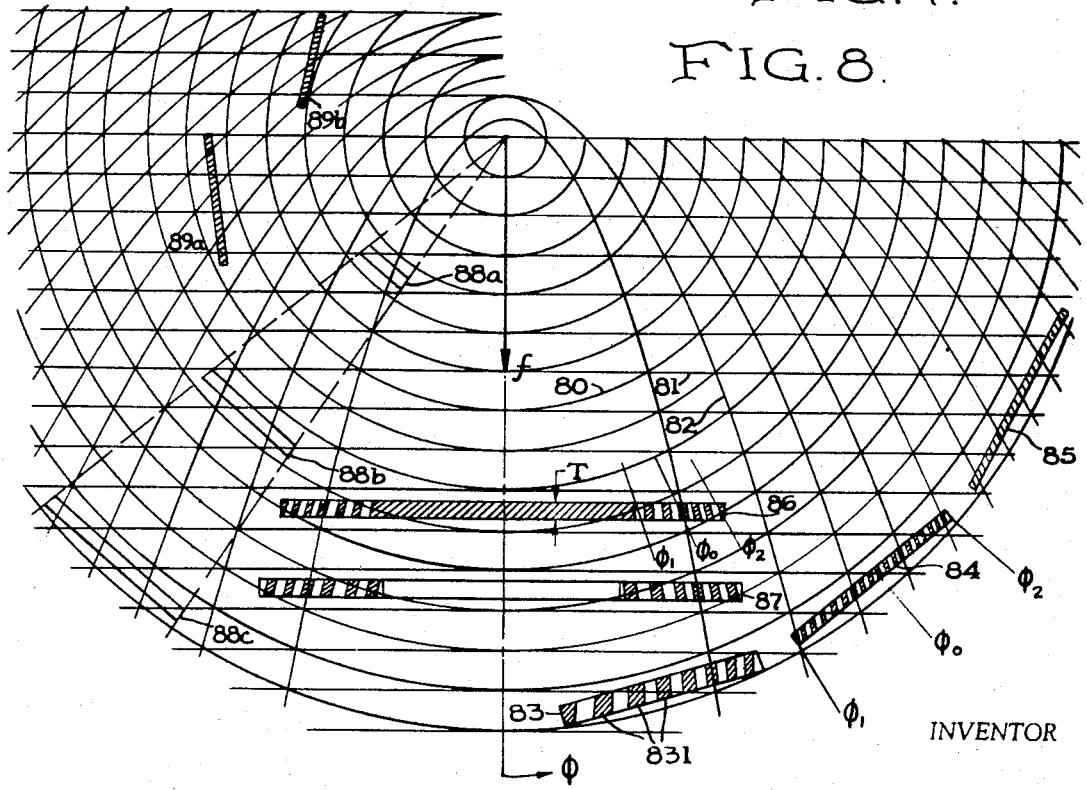
INVENTOR
DANIEL POST
BY KARL W FLOCKS
ATTORNEY Oct. 27, 1970  D. POST  3,536,371
METHOD AND MEANS FOR PRODUCING AND UTILIZING ARRAYS OF
DIFFRACTION TYPE LENSES FOR MICROELECTRONICS
MASK MAKING
Filed July 20, 1967  4 Sheets-Sheet 4
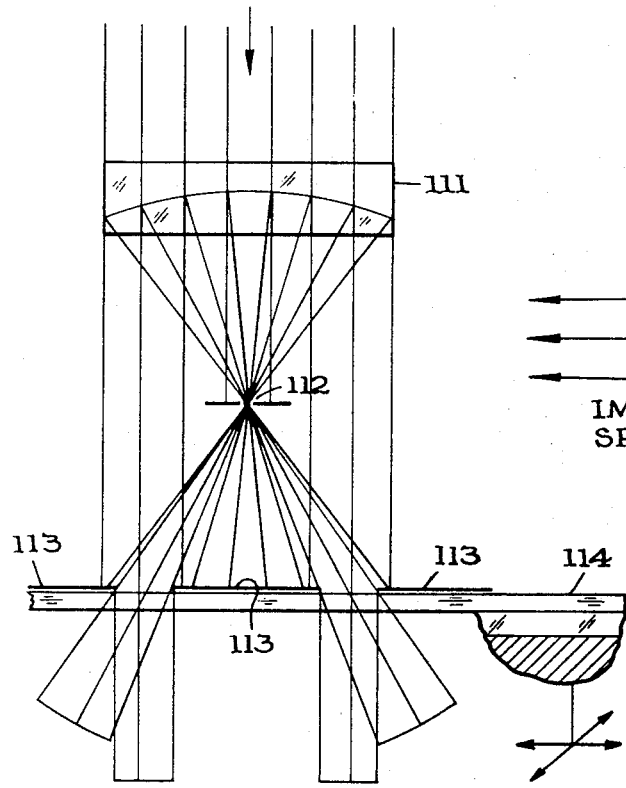
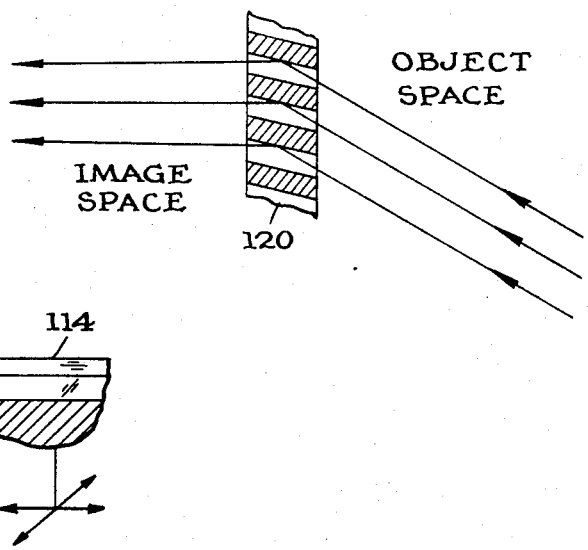
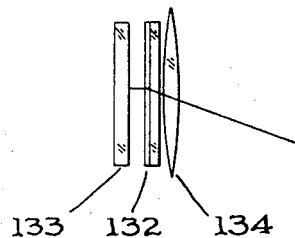
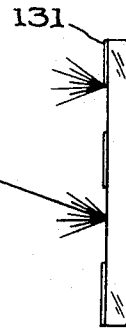
INVENTOR
DANIEL POST
BY KARL W. FLOCKS
ATTORNEY

United States Patent Office 3,536,371
Patented Oct. 27, 1970

3,536,371
METHOD AND MEANS FOR PRODUCING AND UTILIZING ARRAYS OF DIFFRACTION TYPE LENSES FOR MICRO-ELECTRONICS MASK MAKING
Daniel Post, P.O. Box 408, Averill Park, N.Y. 12018
Filed July 20, 1967, Ser. No. 654,748
Int. Cl. G02b 27/38
U.S. Cl. 350—3.5          4 Claims

ABSTRACT OF THE DISCLOSURE

A Hologram of a point object, or a plurality of such holograms, is utilized as a diffraction lens to focus images onto a photosensitive material or other image display means. A more efficient portion of such a hologram, termed a thick diffraction lens, may be used with other thick diffraction lenses to form a multiplicity of identical images for the formation of masks for use in certain manufacturing proceses.

---

The present invention relates to the production of high resolution images, and more particularly to the production of these images and masks from those images through the use of holograms of a point source acting as diffraction lenses.

A primary object of the present invention is the construction of high quality lenses to produce a faithful image of any arbitrary object using diffraction of light instead of refraction of light to form the focused image. These lenses are constructed by capturing a three-dimensional pattern of optical interference within a photosensitive material. No mechanical working of the refracting materials is required.

A further object of the present invention is to produce a multiplicity of high resolution images of an arbitrary object using diffraction of light rays to form the images.

A still further object of the present invention is to produce masks used in the fabrication of components and circuits in the micro-electronics field. Also, it is an object of the present invention to produce masks used in photoetching batches of duplicate parts, such as are used in the manufacture of etched electrical resistors and strain gauges.

In the prior art, high quality images of an arbitrary object are produced by refracting lenses. Masks containing a multiplicity of unit images, as required in the micro-electronics field are produced by step-and-repeat photographic operations. The unit image is projected onto a photographic plate by a refracting lens and a photographic exposure is made. Then, the photographic plate is moved mechanically into the position where the adjacent image should appear and another exposure is made. This step-and-repeat procedure is continued until the required array of unit images is exposed.

By another method of the prior art, photographic masks are produced by fabricating a very large object consisting of the entire array of unit images, each much enlarged. Then the chart is photographed by means of a refracting lens to form a suitably reduced image on a photographic plate. Primary shortcomings of this method involve the difficulty of producing the enlarged object chart with sufficiently accurate spacings between repeated images and also the distortion and degradation of resolution of focused images encountered as the angular field of view of the refracting lens increases.

Still another method of the prior art utilizes a multiplicity of refracting lenses to form a multiplicity of images from a single object. The system is called a "fly's eye camera." Refracting lenses are arranged in an array essentially duplicating the desired array of unit images. Each lens in the array projects a separate image of any single object, thus producing a complete aray of images in one exposure. In such a procedure, 100 to 2500 refracting lenses may be required per square inch for microelectronics masks. Fabrication of such a lens array is exceedingly difficult. Only a very simple lens design for such a lens array can be contemplated thereby severely limiting corrections for distortion and optical abberations. Also, accurate spacing of lenses within the array is exceedingly difficult. Such lens arrays that have been produced have usually been fabricated from plastics, which substance offers diminished dimensional stability compared to glass. In addition, masks produced by the "fly's eye camera" suffer from severe distortion of the unit image and also from limited optical resolution.

Accordingly, the present invention utilizes diffraction of light instead of refraction to focus images. Image formation by diffraction is a useful reality due to the use of the laser and hologram technology. In holography, a diffraction pattern formed from the complex wavefront reflected from an object is captured in a photographic plate. When illuminated, this diffraction pattern directs or focuses the light to form an image of the original object.

The present invention utilizes a hologram of a special type, which has the property that it will focus high resolution images of an arbitrary object. This is distinct from the normal hologram which can only project an image of the object from which it was formed. The invention utilizes the hologram of a point object which possesses this special property. The present invention also utilizes a multitude of such holograms, formed in a single photographic plate or other photosensitive material, so that it is capable of projecting a multitude of images of an arbitrary object.

Other objects and advantages of the invention will become apparent from full consideration of the following detailed description and accompanying drawings, in which:

FIG. 7 shows a pattern depicting a cross-sectional view of interference shells created by the intersection of plane and spherical waves;

FIG. 8 shows a cross-sectional view in diagrammatic form of the intersection of wavefronts as in FIG. 7;

FIG. 11 shows a method for producing the array illustrated in FIG. 10;

FIG. 12 shows an enlarged schematic cross-section of one form of a portion of a thick diffraction lens;

FIG. 13 illustrates a form of producing masks which comprises an array of images of a single object using an array of thick diffraction lenses;

Figure 1:
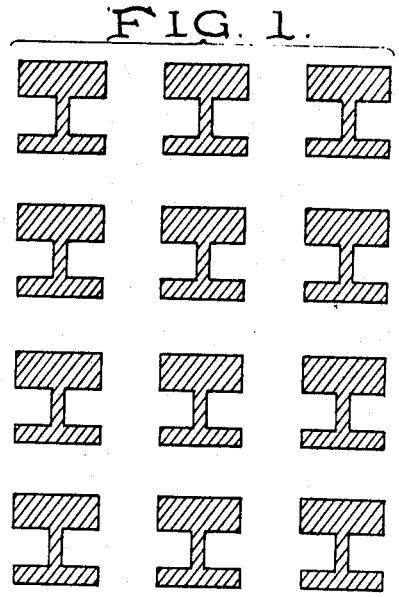
FIG. 1 illustrates a greatly magnified portion of a mask used in the micro-electronics field.

The masks which are used in the fabrication of components and circuits in the micro-electronics field or used in photoetching batches of duplicate parts such as are used in the manufacture of etched electrical resistors and strain gauges are typically photographic glass plates exposed with a multiplicity of identical images uniformly spaced across the plate as illustrated by a section of such a plate greatly magnified in FIG. 1. Each of the figures shown therein forms an opaque area on the otherwise transparent plate. Typically, 100 to 2500 unit images per square inch are used for a micro-electronics circuit and less than 50 per square inch for resistors and strain gauges. The narrowest band likely to be contained in an image is of the order of 100 micro-inches. Therefore, high acutance, that is, a minimum zone of transition from opaque to clear areas, is required at the image boundaries.

The present invention utilizes the hologram of a point object which possesses the special property that it will focus high resolution images of an arbitrary object which is distinct from the normal hologram which can only project an image of the object from which it was formed. A hologram of a point object is formed by exposing a photosensitive material of suitable resolving power to two intersecting coherent wavefronts. The wavefronts may both be spherical as in the case of waves emanating from two different points in space or else one may be spherical and the other plane. Also, both wavefronts may be plane if a companion refracting lens is used in formation of the hologram and projection of the image. The photosensitive material becomes opaque at all points of constructive interference between the waves and remains transparent at points of destructive interference. In space, the locus of points of constructive interference forms a series of concentric shells of revolution. The photosensitive material has finite thickness and captures the intercepted portion of these three-dimensional shells.

Figure 2:
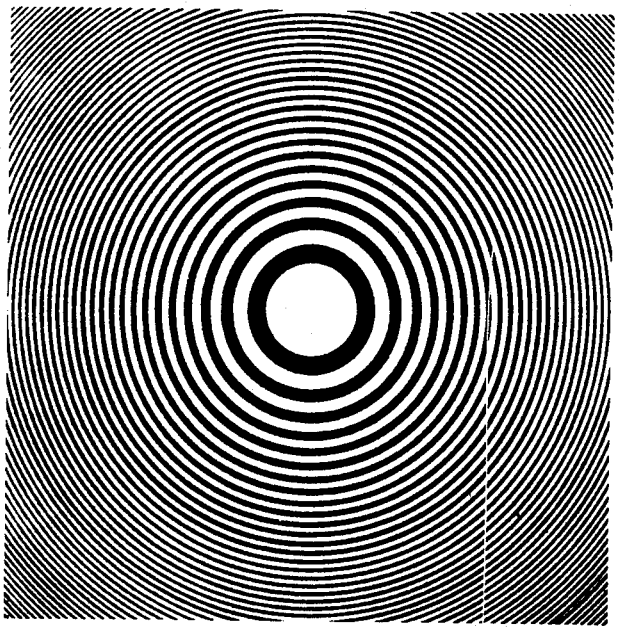
FIG. 2 illustrates a plane zone plate cut from the photosensitive material of a hologram of a point object.
Figure 3:
FIG. 3 shows a cross-section through the photosensitive material of the hologram from which the plate of FIG. 2 is cut.

In plan view, any one plane cut through the photosensitive material exhibits a series of concentric rings as shown in FIG. 2. This is called a plane zone plate. An infinity of plane zone plates of varying dimensions exists in the hologram of a point object, constituting the three-dimensional pattern of constructive interference. In cross-sectional view, a plane cut through the photosensitive material exhibits a series of bands such as is illustrated in the greatly magnified view of FIG. 3.

Properties of plane zone plates are known in the prior art. Of the light received from an object and transmitted by the plane zone plate, about 20% is diffracted into a focused image of the object and the remaining 80% is scattered in the vicinity of the image to form background intensity. This background intensity reduces the contrast of the image, in many instances so severely that the image is useless.

If the hologram of a point object is used, practically all the light is diffracted into a focused image and the contrast of the image practically duplicates the contrast of the object. This is so if a certain efficient portion of the hologram is used. Every portion of the hologram of a point object is capable of projecting an image of an arbitrary object. However, if the central portion of the hologram is used, where the distances between adjacent interference shells may be large compared to the thickness of the photosensitive material, the image contrast degrades to that of the plane zone plate. If other inefficient portions are used, contrast is degraded, but to a much smaller extent than in the case of a plane zone plate.

A term used herein to designate the efficient portion of the hologram is "thick diffraction lens." Thick diffraction lens is herein defined as that portion of a hologram of a point object in which the separation S between the center surfaces of adjacent interference shells is approximately that which allows the opaque interference shells to just obscure the zeroth order diffraction rays. For the case in which the surface of the thick diffraction lens is paralled to the image plane, this separation is approximately $$S = 2T \frac{\sin\frac{\phi}{2}}{\cos\phi}$$

where T is thickness of the photosensitve material and $\phi$ is the angle between the normals to the two interfering wavefronts that form the hologram. Angle $\phi$ varies with the refractive index of the medium containing the waves and it therefore refers to the angle within the photosensitive material at the time of exposure.

A primary facet of the invention is the use of a multiplicity of such thick diffraction lenses to form a multiplicity of identical images. Another primary facet is the production of a multiplicity of thick diffraction lenses suitably formed and spaced for use in making high resolution micro-electronic masks.

Figure 4:
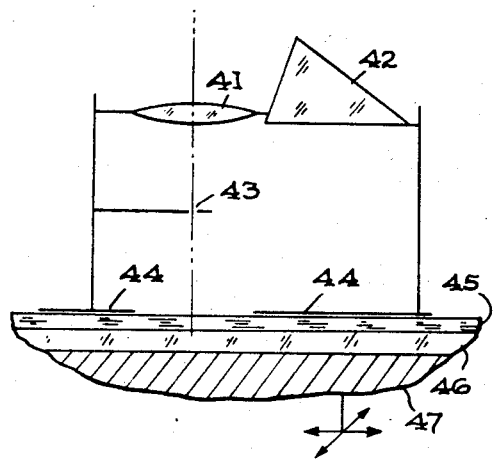
FIG. 4 shows the placement of refracting elements to produce a multiplicity of thick diffraction lenses.
Figure 5:
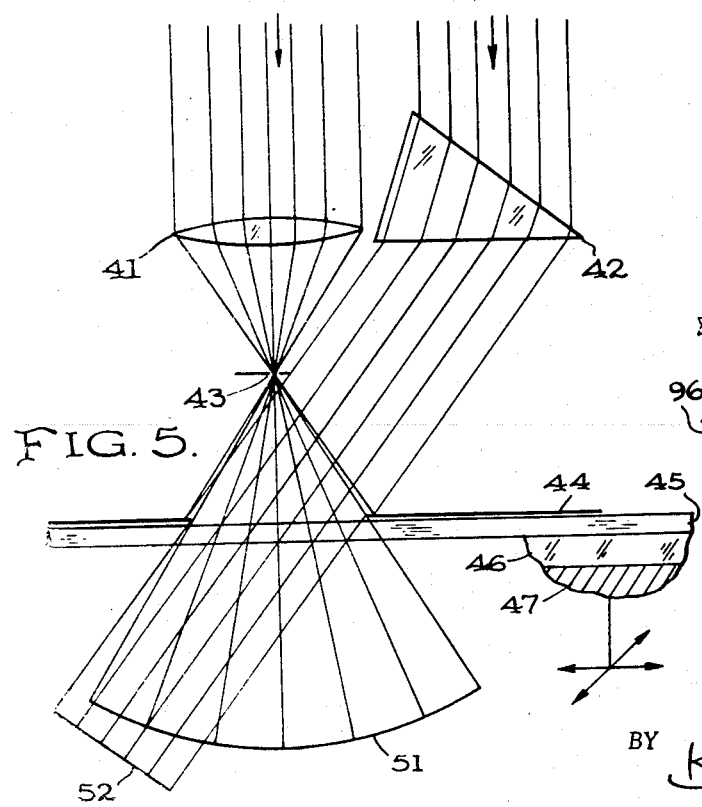
FIG. 5 illustrates a ray diagram of the optical system shown in FIG. 4.

One method for producing a multiplicity of thick diffraction lenses is illustrated by FIGS. 4 and 5. In FIG. 4, 41 is a well corrected refracting lens of high numerical aperture; 42 is a refracting prism; 43 is a pinhole aperture; 44 is a fiield stop; 45 is a photosensitive layer on a glass support 46; and 47 is an accurate step-and-repeat traverse table.

FIG. 5 shows a ray diagram for the optical system of FIG. 4. The system is illuminated by a collimated beam of spatially and temporally coherent light emanating from a laser. Lens 41 coverages the incident light to pass through the pinhole aperture, from which emerges a spherical wave with wavefront 51. Prism 42 directs a portion of the collimated beam into the same space such that a plane wave with wavefront 52 coexists in space with the spherical wave. The photosensitive material 45 is exposed at those points where the two waves experience constructive interference and it remains unexposed at those points where the optical interference is destructive. Thus, the three-dimensional interference pattern comprising the hologram or thick diffraction lens is formed in the photosensitive plate 45.

The angle between the central axis of the spherical beam and the direction of propagation of the plane beam is controlled by the angle and index of refraction of the prism 42.

Field stop 44 is located as close to the photosensitive layer 45 as possible. Its aperture would usually be square, with length of sides equal to the distance between adjacent unit images of the desired mask. Rectangular or circular apertures may also be used.

Figure 6:
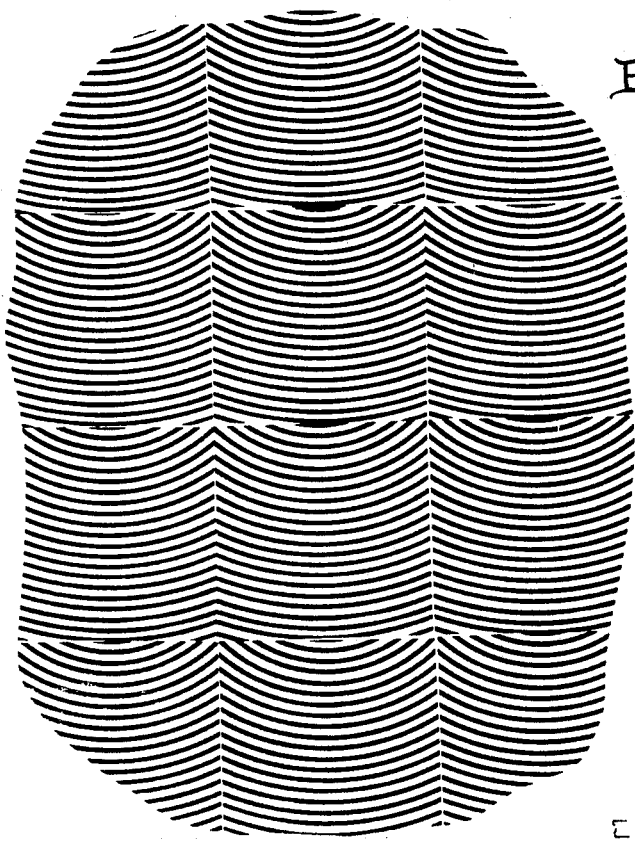
FIG. 6 illustrates a greatly enlarged view of the dark and transparent areas associated with an array of thick diffraction lenses.

In producing the array of thick diffraction lenses, the traverse table is successively indexed to adjacent positions in the array and exposures are made for each position. With this system, a plane passed through the array of thick diffraction lenses would intercept dark and transparent areas having the appearance shown in FIG. 6, but shown much enlarged and with insufficient numbers of interference bands. Each square constitutes the area of the field stop and adjacent squares are formed by successive step-and-repeat exposures of the single hologram. Only a few squares of the many normally produced are shown.

The pattern shown in FIG. 7 depicts a cross-sectional view of interference shells 71 created by intersection of plane and spherical waves 72 and 73, respectively. It shows wavefronts at successively greater distances from their sources. The intersections of these fronts are shown by the moire effect to generate continuous parabolic bands. Thus the interference shells 71 are, in this case, parabolas of revolution or circular paraboloids.

Of course, the wavelength of light is very much smaller than the distance between adjacent wavefronts shown in the figure and very many more interference shells are formed. However, in any region an interference shell has the shape indicated by the bands of intersection shown in FIG. 7. The hologram is formed by intercepting some portion of these interference shells with a photosensitive material.

FIG. 8 shows a cross-sectional view of a similar pair of intersecting wavefronts. Spherical wavefronts, e.g. 80, radiate outwards from the center of the circles and plane wavefronts, e.g. 81, propagate downwards. They intersect along parabolic curves 82. These curves are the centerlines of the parabolic bands of FIG. 7. Region 83 represents the spatial position of photosensitive material 45 in relation to the interfering waves. Bands 831 represent the captured portions of interference shells. With reference to FIG. 5, region 83 changes as the inclination of the plane wavefront is changed and also as the distance between point 43 and the photosensitive material is changed. Region 84 represents the captured interference pattern when inclination of the plane wavefront is increased.

Another method of forming an array of thick diffration lenses utilizes a plane mirror to direct the plane beam, instead of prism 42 of FIG. 5. In all other respects the method is the same as that described in connection with FIG. 5. With this method, greater angles of intersection between the two wavefronts are possible. A representative spacial position of the photosensitive material with respect to the interfering waves is depicted by 85 in FIG. 8. With similar apparatus, the photosensitive material can assume the spacial position 89a (FIG. 8), where the normal to the plate makes a small angle with the wave front of smaller curvature. Position 89b may be obtained with the use of additional mirrors which direct one beam into the photosensitive material from its rear surface while the other beam enters from the front surface. These offer the advantage of very wide angular separation between the focused image and other diffraction orders.

Figure 9:
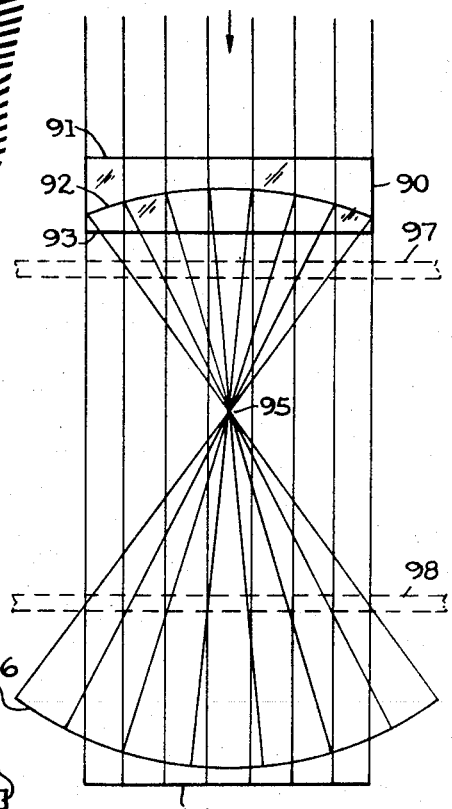
FIG. 9 illustrates another means of forming a hologram of a point object.

Another means of forming a hologram of a point object is illustrated in FIG. 9. It utilizes an optical element 90 having a plane surface 91, an internal partially reflective paraboloidal surface 92 and a plane partially reflective surface 93. When illuminated by a collimated beam of coherent light, a fraction of the light penetrates the element without reflection and continues as a collimated beam with plane wavefront 94. Another fraction of the light suffers a single reflection at each of the partially reflecting surfaces and converges to point 95. A spherical beam having wavefront 96 diverages from this point. The hologram can be captured by exposing a photosensitive material in the path of the intersecting beams, for example, at location 97 or location 98. This hologram is depicted by position 86 in FIG. 8.

A thick diffraction lens is a portion of such a hologram. Since the thickness T of the hologram is constant, the angle of intersection, $\phi$, of interfering waves must be restricted in order to perform as a thick diffraction lens. This can be accomplished by obliterating the interference shells in the central region, as shown in section 86 of FIG. 8. Then, $\phi$ is restricted within the limits $\phi_1$ and $\phi_2$. Obliteration of any undesired portion of the hologram can be accomplished by intercepting that portion with a separate beam of light. This can be done simultaneously with the hologram exposure or in a separate operation.

Single thick diffraction lenses of this configuration are particularly appropriate for applications requiring large aperture long focal length lenses, for example, telescope objectives.

An array of such holograms or thick diffraction lenses can be formed by installing the photosensitive material on an accurate step-and-repeat transverse and making successive exposures at the required locations.

Figure 10:
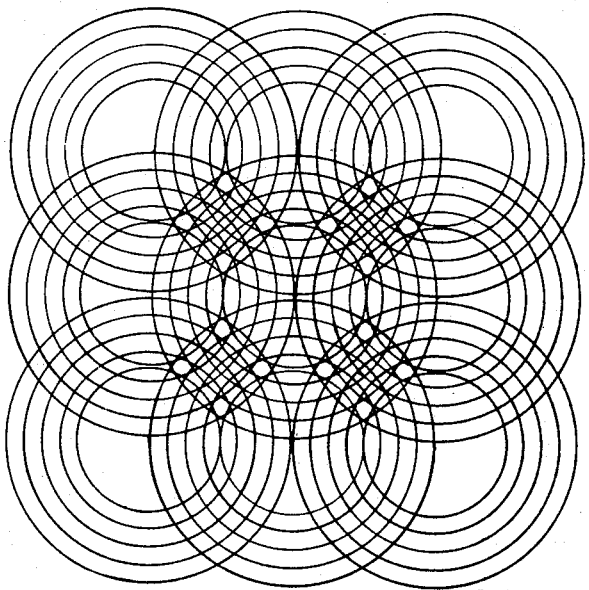
FIG. 10 illustrates an enlarged portion of an array intercepted by a plane parallel to the surface of the photosensitive material formed by a different arrangement of elements.

Another method of producing a multitude of thick diffraction lenses suitable for projecting an array of images of a single object utilizes thick diffraction lenses whose lateral extent is much greater than the stepping distance. A portion of one such array is illustrated in FIG. 10, which indicates the opaque and transparent rings intercepted by a plane passed parallel to the surface of the photosensitive material. A method for producing such an array is illustrated in FIG. 11. When illuminated by coherent rays emerging from a distant point source, element 111 produces two interfering beams. A pinhole aperture 112 becomes the source of spherical waves. A field stop, 113, located immediately adjacent to the photosensitive material 114, allows only an annular section of these beams to pass through the photosensitive material. An exposure is made and the photosensitive material is moved to an adjacent position, the displacement being smaller than the diameter of the annulus. This exposure and stepping procedure is repeated until the required array is formed. Any single thick diffraction lens thus formed appears in cross-section as shown by region 87 in FIG. 8. This differs from the cross-section shown in region 86 primarily by the absence of the opaque zone within the annulus of region 86.

The photosensitive material used to capture the three-dimensional pattern of constructive interference can be any photosensitive material capable of suitable resolution which changes in opacity or color upon exposure to light and subsequent treatment. Photographic materials such as those in the silver halide and diazo families are suitable, as are various photosensitive plastics and photosensitive glasses.

FIG. 12 shows an enlarged cross-sectional view of a portion of a thick diffraction lens, as formed in region 83 of FIG. 8. When an arbitrary object is placed in the object space at a large distance from the thick diffraction lens and illuminated by monochromatic light, a corresponding image appears in the image space. If the lens 120 was formed by interference between a plane and spherical wave, the focal length $f$ of the lens is the distance between the origin of the spherical wave and the photosensitive material, as shown in FIG. 8. The optical axis of the thick diffraction lens is the axis of the parabolas of revolution. If the lens was formed by interference between the two spherical waves of radius $r_0$ and $r_1$, the focal length $f$ is $$f = r_0 r_1 / (r_0 + r_1)$$

As indicated schematically in FIG. 12, rays of a single diffraction order are reflected at the opaque interference surfaces and emerge in the image space to form an image of every object point by diffraction. Rays of other diffraction orders which tend to emerge in different directions are either stopped by the opaque interference shells or else they emerge with negligibly small energies. For off-axis object points, however, increased amounts of light emerge in directions of other diffraction orders, and contrast may be degraded for large angular fields of view.

Masks which are comprised of an array of images of a single object are produced from an array of thick diffraction lenses as shown in FIG. 13. An object 131 which may be a magnified opaque and transparent chart is illuminated by diffused, nearly monochromatic light of either the same wavelength or of a different wavelength from that used to form the thick diffraction lenses. The array of thick diffraction lenses 132 is positioned parallel to the object plane at a suitable large separation. A photographic plate 133 is positioned parallel to the lens array at a suitable small separation. The relationships between focal length, object distance, image distance and magnification are the same as the well known thin refraction lens formulae. A single exposure produces the array of reduced size images on the photographic plate.

With this system, but with the absence of refracting lens 134, the distance between adjacent images is greater than the distance between adjacent thick diffraction lenses by the factor $1+M$, where M is the magnification ratio, here a small fraction. For convenience the distances can be made equal by employing a long focal length refracting lens 134, immediately adjacent to the array of thick diffraction lenses. With this system, the object is located in the focal plane of the refracting lens. Thus, light from any object point becomes a parallel beam prior to encountering the array of thick diffraction lenses and each diffraction lens in the array receives an identical distribution of incident light.

The space between the array of thick diffraction lenses and the photographic plate may be filled with a refractive fluid, for example, oil of refractive index of 1.5. Then the wavelength of light in the image space is decreased and the image distance is increased by a factor equal to the refractive index. Magnification, however, remains unchanged.

If the highly coherent light of a laser is used to illuminate the object, a moving diffuser between the laser and the object should be utilized. If the diffuser is stationary, stationary diffraction patterns will emerge and cause uneven illumination of the object.

FIG. 8 is again referred to as an aid to the design and visualization of thick diffraction lenses. Study of FIG. 8 shows that separation between interference shells depends only upon wavelength $\lambda$ and angle $\phi$. It shows that lines tangent to the shells everywhere bisect the angle between normals to the wavefronts. It shows how the interference shells are disposed along the extent of the thick diffraction lens, how they vary with angular extent, $\phi_1-\phi_2$, and with focal length, $f$, of the thick diffraction lens. Similar curves can be drawn for systems wherein the interfering wavefronts are both spherical.

Optical resolution of images projected by thick diffraction lenses increases as $\phi_1-\phi_2$ increases. Resolution is independent of $\phi_0$ and $f$. The level of background intensity, which leads to contrast degradation for off-axis object points, also increases with $\phi_1-\phi_2$; this degradation is trivial when $(\phi_1-\phi_2)/\phi_0$ is small, e.g., 0.2, but it becomes more serious for high values. In the rational design of thick diffraction lenses, the designer must provide a suitable compromise between resolution, angular field of view and contrast, compatible with the purpose for which the lens is designed. Thus, there is no absolute limit that prescribes the angular extent of a thick diffraction lens, but only a subjective limit that depends upon the judgment of the designer.

The resolution of thick diffraction lenses also depends upon the plan view configuration of the lens. Resolution increases as the ratio of plan area to the square of focal length increases. Lenses based upon the design illustrated by 86 in FIG. 8 have the advantage of maximizing this ratio for any given value of $\phi_1-\phi_2$.

The angular field of view for a fixed limit of contrast degradation increases as $\phi_0$ increases.

A family of thick diffraction lenses of identical characteristics, but different focal lengths, is defined in terms of FIG. 8 by the angles intercepted by any one member of the family. For example, lenses indicated as 88a, 88b and 88c have focal lengths equal to their distances from the origin of spherical waves, but otherwise their performance is identical. The lateral extent of each member of the family is proportional to the focal length. The physical thicknesses of the thick diffraction lenses in any family are always equal, since the separation between adjacent interference shells depends only upon angles $\phi$ and wavelength.

The separation, S, between adjacent interference shells is calculated by the equation $$S = \lambda / \left(2 \sin \frac{\phi}{2}\right) = \lambda_0 \left(2n \sin \frac{\phi}{2}\right)$$

where $\lambda$ is the wavelength of light within the photosensitive material, $\lambda_0$ is the wavelength in vacuum and $n$ is the index of refraction of the photosensitive material. The relationship for thick diffraction lenses giving the optimum separation in terms of thickness, T, of the photosensitive material is $$S = 2T \frac{\sin \phi/2}{\cos \phi}$$

From these relationships, $$T = \frac{\lambda_0}{2n} \frac{\cos \phi}{(1-\cos \phi)}$$

Using representative values of $\lambda_0 = 25 \times 10^{-6}$ inches and $n=1.5$, the optimum thicknesses of photosensitive material are given in the following chart.

| $\phi$, degrees | 1 | 4 | 15 | 30 | 60 |
|---|---|---|---|---|---|
| T, inches | 0.055 | 0.0035 | 0.00024 | 0.000058 | 0.000008 |
| S, inches | 0.0010 | 0.00024 | 0.000064 | 0.000032 | 0.000017 |

Suitable photosensitive materials can be produced in this entire range of thicknesses, and beyond. While called "thick diffraction lenses," the physical thicknesses of these lenses are not large dimensions.

Separations between adjacent interference shells are also calculated from the above equation. Photosensitive materials possessing the required resolution capabilities are available for each corresponding thickness.

Holograms of point objects which have achromatic lens properties are made by successively exposing a photosensitive material to the holograms of a point object, using two or more different wavelengths of light. For each wavelength, the two interfering waves must emerge from the same two points in space, and the photosensitive material must remain at a fixed distance from the sources during the successive exposures. The resultant "achromatic hologram of a point object" or "achromatic thick diffraction lens" projects images in exact dimensional registration for each wavelength. Best performance is achieved when $\phi$ is large.

In practical application of this method, refraction errors introduced by imperfections in the photosensitive material or in the transparent plate that may be used to support the photosensitive material can be nullified by immersing portions of the apparatus or the entire apparatus in a medium of refractive index matching the photosensitive material or its support.

The methods shown here for producing arrays of thick diffraction lenses are not exhaustive. Those skilled in the art can design other systems that are similar to these or optically equivalent to these. With minor and obvious modifications, the methods described here also teach methods for producing:

(a) arrays of holograms of a point object
(b) single thick diffraction lenses
(c) single holograms of a point object.

A plane zone plate has been defined in connection with FIG. 2. Arrays of these plane zone plates can be used in the same way as arrays of thick diffraction lenses to provide useful images for some applications. They have the advantage that they can be produced by graphic arts and conventional mask making techniques. As in the case of arrays of thick diffraction lenses, arrays of plane zone plates provide the capability of projecting a multiplicity of images from a single object.

When the exposed area of the image is small compared to the area of the plane zone plate lens, the image contrast remains high. When the ratio of exposed image area to lens area is 0.1, contrast is adequate for most mask applications; with a ratio of 0.01, contrast is excellent and results match or exceed that of prior art methods.

Whereas plane zone plates are formed with equal areas of opaque and transparent zones, improved performance is obtained when the widths of transparent zones are decreased systematically. For example, contrast of projected images is improved if the inner annulus of every transparent ring is made opaque, such that the opaque area becomes twice the transparent area for every zone. This improvement in contrast also applies when an array of plane zone plates is used to project an array of images from a single object.

In the present invention the primary advantage of the use of thick diffraction lenses and holograms of a point object are their very simple method of construction, utilizing direct optical and photographic methods. Ease of production compares very favorably to the production of refracting lenses which must be mechanically worked by grinding and polishing operations to extraordinarily small tolerances. Design time, production time and overall costs are all appreciably less for thick diffraction lenses.

Furthermore, thick diffraction lenses and holograms of a point object, of vastly different apertures and focal lengths can be designed and constructed with equal ease. Optical absorption can be controlled over a wide range of wavelengths by utilizing different photosensitive materials.

In addition, arrays of thick diffraction lenses and arrays of holograms of a point object offer the immense advantage of producing arrays of high fidelity images from a single object. Thus, high quality masks can be produced very quickly and very economically.

A set of masks produced by means of an array of thick diffraction lenses or by means of an array of holograms of a point object exhibit identical spacings between corresponding unit images on every mask of the set. Consequently, in use of the masks, perfect registration throughout the entire area is possible.

A further advantage in the comparison of refracting lenses and thick diffraction lenses is the very small mechanical thickness and correspondingly small weight of the thick diffraction lenses compared to these qualities of the refracting lenses.

It will be obvious to those skilled in the art that various changes may be made without departing from the scope of the invention and the invention is not to be considered limited to what is shown in the drawings and described in the specification.

What is claimed is:

1. Method of making and utilizing a multiplicity of thick diffraction type lenses in side-by-side array which comprises:
   forming the diffraction type of lenses by intercepting and recording in three-dimensional photosensitive material a plurality of times in side-by-side array across said photosensitive material the interfering shells from a first series of wavefronts of light emanating from a point source and a second series of wavefronts of light emanating from a second point source and directed so as to intersect said first series of wavefronts of light,
   only a selected portion of said interfering shells being intercepted and recorded in said photosensitive material,
   and said selected portion being the portion in which the separation between the center surfaces of adjacent interference shells is approximately that which allows the opaque interference shells to just obscure the zeroth order diffraction rays and intercepting with said diffraction type of lenses the light emanating from an object.

2. The method of claim 1, further characterized by intercepting the light emanating from an object after it passes through said diffraction type lenses and recording the images therefrom in a photosensitive material whereby an array of images of the object is produced in the last-mentioned photosensitive material to form a mask.

3. Apparatus for forming a multiplicity of thick diffraction type lenses in side-by-side array comprising:
   light means from a point source to produce a first series of wavefronts of light,
   light means from a second point source to produce a second series of wavefronts of light,
   said first and second wavefronts of light intersecting each other,
   three-dimensional photosensitive means located so as to intercept said intersecting wavefronts,
   and means to expose selected portions of said photosensitive material in side-by-side array, to said first and second wavefronts of light,
   said exposed selected portions being the portions in which the separation between the center surfaces of adjacent interference shells from said first and second series of wavefronts of light is approximately that which allows the opaque interference shells to just obscure the zeroth order diffraction rays.

4. The apparatus of claim 3, further characterized by said means to expose selected portions including:
   cover means over said photosensitive means with said cover means having at least one aperture therethrough,
   and means to move said photosensitive means so as to expose successive side-by-side portions of said photosensitive means.

References Cited

UNITED STATES PATENTS 3,405,614   10/1968   Lin et al. _____ 350—3.5

OTHER REFERENCES

Rottmann et al.: "Zone Lens Array for Fabrication of Multiple-Image Patterns," IBM Technical Disclosure Bulletin, vol. 9, No. 1, June 1966, p. 48.

George et al.: "Holographic Diffraction Gratings," Applied Physics Letters, vol. 9, No. 5, September 1966, pp. 212–215.

JOHN K. CORBIN, Primary Examiner